June 17, 1924.
J. L. NILSON ET AL
1,497,932
AIR PUMP COUPLING
Filed Dec. 10, 1920.
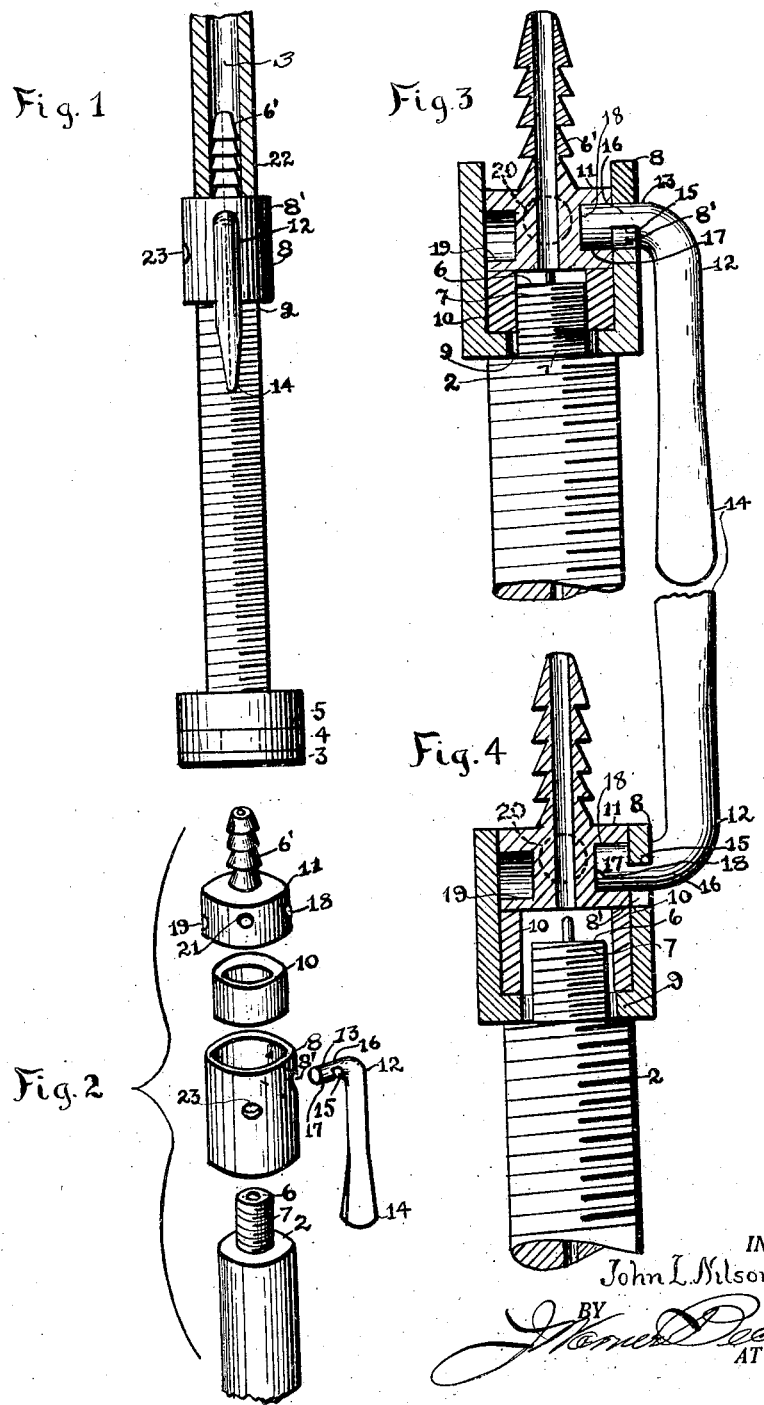
INVENTORS:
John L. Nilson & John Prince
BY
ATTORNEY.

Patented June 17, 1924.

1,497,932

UNITED STATES PATENT OFFICE.

JOHN L. NILSON AND JOHN PRINCE, OF CHICAGO, ILLINOIS.

AIR-PUMP COUPLING.

Application filed December 10, 1920. Serial No. 429,765.

*To all whom it may concern:*

Be it known that we, JOHN L. NILSON and JOHN PRINCE, citizens of the United States, residing at Chicago, in the county of Cook and State of Illinois, have invented certain new and useful Improvements in Air-Pump Couplings, of which the following is a specification.

Our invention relates to the more expeditious coupling devices for flexible air-conduit tubes, and has particular reference to the instantaneous clamp couplings to be connected with the air-inlet stems of pneumatic tires and which have replaced the slower forms of threaded couplings. The present invention is an improvement upon these more popular forms of "air-chucks," "pump connections" and the like, in that it embodies a simplified construction which may be manufactured at a reduced cost, by its elimination of machine operations such as cam-slots and the like. The elimination of parts heretofore found to be weak and easily disarranged, such as delicate and plural pivot bearings, is also contemplated by the present improvement, as well as a more conveniently accessible and operable form, and one that may be assembled or taken apart by the unskilled without the aid of tools. Provision is also made in simple form for adjustments to take up wear in or partial collapse of the nipple-grip part or elastic fiber bushings common to all of the present forms of couplings.

With the above named objects in view our invention consists of the novel construction, combination and arrangement of parts, hereinafter described in detail, illustrated in the accompanying drawing and more particularly pointed out in the appended claims.

In the drawing—

Figure 1 is substantially a full size view in elevation of the common form of air tube valve casing or stem together with a section of pump hose attached thereto.

Figure 2 is a perspective view of the parts of said stem separated.

Figure 3 is an enlarged section taken substantially on the line 3—3 of Figure 1.

Figure 4 is similar to Figure 3 with part of the lever broken away and the grip elements in released position.

In the several views 2 represents an exteriorly threaded inner tube stem, or valve-casing of common and well known construction. This stem is shown provided at its lower end with the usual fixed disk or flange 3, between which and a loose washer 4 the opposite walls of an inner tube are clamped with the aid of a nut 5. On its upper end is shown the usual interiorly and exteriorly threaded nipple —6— with which either a threaded or clamp coupling may be connected, the former type being engaged with the exterior threads 7 which are unnecessary to the form of coupling involved in the present invention.

The embodiment of the present improvement includes the usual sleeve or tube section 8, but in the simplified form of the present construction. The part 8 is provided with the usual inner flange 9 which supports an elastic or rubber bushing 10 that is common to all of the devices of this class and which is compressed against the nipple 6 to form an air-tight joint between it and the conduit tube leading from the air pump or source of air under pressure. The bushing 10 is compressed by a plunger, plug or follower 11 which carries the usual nipple —6'— with which the flexible pump hose is connected.

In the present improvement the various previous forms of grooves, cam-slots and pivot bearings provided for the movement of the plunger 11 are obviated by the substitution of a simple drill bore 8' in one side of the sleeve or plunger casing 8, and one or more similar bores are made in the plunger 11. A simplified and readily accessible lever 12 is formed of a section of ordinary rod bent at one end to form a strong bearing lug 13 and having its opposite end partly flattened to form a handle or finger-grip portion 14, although the lever will serve equally as well without flattening the part of the rod labeled 14. The lug 13 is caused to serve both as a journal bearing in the casing or sleeve 8 for said lever and as a cam eccentric by cutting therein a notch or recess 15 of sufficient width to pass the edges of the bore 8', or of a width slightly more than the thickness of the wall of the sleeve or casing 8, as shown in Figures 3 and 4 on a large scale. That portion of the lug 13 which is in the plane of its slot 15, or the thus reduced portion, is the journal or axis of the lever 14 and is separately designated by the numeral 16. The extreme end, or uncut portion, of the lug 13, is an eccentric bearing relative to the bearing 16 and is separately labeled 17. The eccentric 17 is seated in a shallow bore 18 made in the side of the plunger 11, said bore 18 being of substantially the same size as the bore 8'. Rotation of the lever 14 thus imparts movement to the plunger 11.

By making in the periphery of the plunger 11 a plurality of bores 18, but at different levels with reference to the axis of the latter, such as a bore 19 on a lower plane and a bore 20 on a higher plane, we provide in an inexpensive manner for adjustability of the plunger, or for compensation to take up wear in or weakening of the bushing 10. Thus engagement of the eccentric 17 with the bore 19 will elevate the plunger and adapt it to a bushing 10 that is a little longer than the one shown herein. On the other hand the bore 20 will effect a lower adjustment and adapt the plunger to a shorter, or a worn or weakened bushing 10. In Figure 2 an additional hole 21 is shown, and, obviously, these bores may be made as numerous as the plunger body provides space for, although ordinarily one bore in addition to the bore 18 would, perhaps, double the life of the bushing 10. The latter, however, is not of so much importance as the facility this adjustment affords for thus repairing a leaky joint where a new bushing is not on hand or obtainable.

As the lever 14 is confined to one side of the casing 8 and moves in a plane that is parallel to the hollow stem 2 and the air-pump hose —22— its arc of movement is not limited by contact with the parts to which it is attached, and the length of its leverage can be extended to any desired extent without taking up appreciable extra space. One of the difficulties connected with these devices has been the limited pinch-grip upon the lever element, in some cases amounting to merely a finger-nail hold between the casing and the lever.

The large circumference, or friction surface, of the cam 17 also provides for variation in the extent of movement in the plunger 11, which by reason of its construction and arrangement enables it to retain a position between the extremes of lever-throw shown in Figures 3 and 4, if sufficient compression of the bushing 10 is accomplished before the end of the inward movement of the plunger 11. Hence the latter may be spared the undue crushing strains imposed by devices which will not "hold" except at the end of the locking movement represented in Figures 1 and 3.

In Figures 1 and 2 is shown a modification which consists of adding one or more holes to the casing, the one additional hole shown being indicated by the numeral 23. Such additional casing bores may take the place of the bores 19, 20 and 21 in the follower, or be supplemental thereto, as doubling the range of adjustment afforded by the bores 18, 19, 20 and 21, if a similar number or differently positioned bores 8' be provided for the casing. An additional bore 23 in the casing has the advantage of providing exterior visual information of the fact that the lever is adjustable relative to the follower.

The engagement of the movement-transmitting portion of the lever with the side of the follower, instead of having, say, the cam bearing against the top of the follower, brings the manual power closer to the bushing 10, or the nipple with which the coupling is connected, and obviates the tendency of the coupling connected with the nipple, to tip sidewise as where the leverage for compressing the bushing is applied farther away from the nipple. This tipping tendency has often caused leaky connections, or necessitated release and readjustment of the coupling with a consequent loss of time.

We claim as our invention—

1. The combination with a casing and a follower having concentric journal and cam bores co-operating in one side of said casing and follower, of a lever having a journal portion and an eccentric portion mounted in one of said bores.

2. The combination with a casing and a follower, having concentric bores, of a lever fulcrumed in said casing and operatively engaging only one side of said follower intermediate of its ends.

3. In combination with a casing and its follower, of a lever having bearing parts engaging said casing and follower at points intermediate of their ends said bearing parts being variably adjustable between said ends.

4. The combination with a casing and follower, of lever-bearings in one side of said casing and in several places in said follower, along its path of movement and a lever having bearing-parts which are eccentric to each other and which engage said bearing-parts.

5. The combination with a casing and its follower, of lever bearings in said casing and follower, and a lever having bearing parts that are eccentric to each other, one of said parts engaging the casing and the other engaging the follower, the bearings of said lever being adjustable parallel to the path of relative movement of said casing and follower.

6. The combination with a casing and follower, each having in their one side bearing-parts to be engaged by lever-portions, a lever, and means for adjusting said lever-portions into different positions in said follower.

7. The combination with a casing and follower, of lever-bearings therein, a lever having eccentric to each other bearing-parts engageable with said lever-bearings, and means for shifting the position of said bearing-parts relative to said follower.

8. The combination with a casing and follower, the former having a journal bore and the latter having plurality of cam bores therein, of a lever with a bent out lug portion formed with relatively eccentric bearing portions engageable with said journal bore and with either of said cam bores.

9. The combination with a casing and follower, of relatively adjustable bearing-portions in said casing and follower, and a lever having a pair of adjacent and to each other eccentric bearings engageable with said bearing-portions.

10. The combination with a casing and a follower movable therein, said casing and follower having in their sides a plurality of bearing-bores arranged in different planes transversely of the path of movement of the follower, of a lever having a bent portion, and a journal and cam formed in said portion and adjustably engageable with said bearing-bores.

In testimony whereof we have hereunto signed our names.

JOHN L. NILSON.
JOHN PRINCE.